US012754286B2

(12) United States Patent
Elangovan et al.

(10) Patent No.: US 12,754,286 B2
(45) Date of Patent: Oct. 6, 2026

(54) FRICTION ESTIMATION FOR A VEHICLE

(71) Applicant: Ford Global Technologies, LLC, Dearborn, MI (US)

(72) Inventors: Vivekanandh Elangovan, Canton, MI (US); Sai Prasanth Velusamy, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 474 days.

(21) Appl. No.: 18/336,574

(22) Filed: Jun. 16, 2023

(65) Prior Publication Data

US 2024/0418828 A1 Dec. 19, 2024

(51) Int. Cl.

| | |
|---|---|
| ***G01S 7/41*** | (2006.01) |
| ***B60T 8/171*** | (2006.01) |
| ***G01S 13/88*** | (2006.01) |
| *G01S 13/931* | (2020.01) |

(52) U.S. Cl.

CPC ............... *G01S 7/411* (2013.01); *B60T 8/171* (2013.01); *G01S 13/885* (2013.01); *B60T 2210/12* (2013.01); *G01S 2013/93185* (2020.01)

(58) Field of Classification Search

CPC ......... G01S 7/411; G01S 13/885; B60T 8/171

See application file for complete search history.

(56) References Cited

U.S. PATENT DOCUMENTS

| | | | | |
|---|---|---|---|---|
| 10,823,844 | B2 * | 11/2020 | Arndt | G01S 13/878 |
| 11,140,813 | B1 * | 10/2021 | Morrison | A01B 69/004 |
| 2009/0173147 | A1 * | 7/2009 | Sandomirsky | E02D 1/022 73/84 |
| 2017/0101103 | A1 * | 4/2017 | Foster | A01B 63/11 |
| 2019/0047527 | A1 * | 2/2019 | Falconer | B60W 10/184 |
| 2020/0110170 | A1 * | 4/2020 | Chandra | G01N 27/048 |
| 2020/0292472 | A1 * | 9/2020 | Wolleben | A01G 25/167 |
| 2023/0234559 | A1 * | 7/2023 | Potter | A01B 69/008 |

OTHER PUBLICATIONS

Usman Mahmood Khan and Muhammad Shahzad, Estimating Soil Moisture using RF Signals, ACM Mobi Com Oct. 17-21, 2022,Sydney,NSW,Australia. (Year: 2022).*

(Continued)

*Primary Examiner* — Marcus E Windrich

(74) *Attorney, Agent, or Firm* — Frank Lollo; Price Heneveld LLP

(57) ABSTRACT

A vehicle includes at least one wheel that drives a tire to move the vehicle along a support. The vehicle includes a radio-frequency (RF) transceiver that transmits an RF signal toward the support and measures a reflected signal. The vehicle includes a drive unit that drives rotation of the at least one wheel. The vehicle includes control circuitry in communication with the RF transceiver and the drive unit. The control circuitry is configured to estimate a moisture condition of the support based on the reflected signal, determine a level of friction between the tire and the support based on the moisture condition, and communicate an output to adjust force between the tire and the support in response to the level of friction.

20 Claims, 5 Drawing Sheets

(56) References Cited

OTHER PUBLICATIONS

Yousef Abbaspour-Gilandeh, Fereshteh Hasankhani-Ghavam, Gholamhossein Shahgoli, Vali Rasooli Sharabiani, Investigation of the Effect of Soil Moisture Content, Contact Surface Material and Soil Texture on Soil Friction and Soil Adhesion Coefficients, University of Mohaghegh Ardabili, Ardabil, Iran, Nitra, Slovaca Universitas Agriculturae Nitriae, 2018, pp. 44-50.

A.F. Tola, Adewale Sedara, O.B. Olatunde, Ayoola Abiola Babalola, Effect of soil moisture content, dynamic load and wheel slippage in measuring traction in an indoor traction bed, Scientific Journal, Agricultural Engineering, Year XLVI, No. 1, 2021, pp. 22-30, Original Scientific Paper, University of Belgrade, Faculty of Agriculture, Institute of Agricultural Engineering.

Omar Soliman Ali Hassan, Thesis Modelling of the soil mechanical properties to soil moisture conditions and their applications to study the traction developed by lugged tire, Jul. 1980, Quebec, Canada.

Usman Mahmood Khan and Muhammad Shahzad, Estimating Soil Moisture using RF Signals, ACM MobiCom ’22, Oct. 17-21, 2022, Sydney, NSW, Australia.

* cited by examiner

FRICTION ESTIMATION FOR A VEHICLE

FIELD OF THE DISCLOSURE

The present disclosure generally relates to friction estimation for vehicles and, more particularly, to systems and methods for determining friction conditions between vehicle tires and a support surface using radio-frequency signal processing.

BACKGROUND OF THE DISCLOSURE

Conventionally, traction control systems may detect friction using active feedback.

SUMMARY OF THE DISCLOSURE

According to a first aspect of the present disclosure, a vehicle includes at least one wheel that drives a tire to move the vehicle along a support. The vehicle includes a radio-frequency (RF) transceiver that transmits an RF signal toward the support and measures a reflected signal. The vehicle includes a drive unit that drives rotation of the at least one wheel. The vehicle includes control circuitry in communication with the RF transceiver and the drive unit. The control circuitry is configured to estimate a moisture condition of the support based on the reflected signal, determine a level of friction between the tire and the support based on the moisture condition, and communicate an output to adjust a force between the tire and the support in response to the level of friction.

Embodiments of the first aspect of the present disclosure can include any one or a combination of the following features:

- the control circuitry is configured to control the RF transceiver to output the RF signal at a first phase and compare a second phase of the reflected signal to the first phase to detect a phase difference and estimate the moisture condition of the support based on the phase difference;
- the control circuitry is configured to determine a propagation delay based on the phase difference;
- the support is soil and the control circuitry is configured to estimate a soil compactness level based on the propagation delay;
- the control circuitry is further configured to determine a target delay for the RF signal based on the distance and compare the target delay to the propagation delay to estimate the moisture condition;
- the control circuitry is configured to detect an amplitude difference between the RF signal and the reflected signal and determine a reflection coefficient of the support based on the amplitude difference;
- the support is soil and the control circuitry is configured to estimate a soil compactness level based on the reflection coefficient;
- the control circuitry is configured to determine a shear modulus of the support based on the phase difference;
- the control circuitry is configured to determine a friction angle of the support based on the phase difference;
- a brake system configured to selectively limit rotation of the tire in response to the moisture condition;
- the control circuitry includes a motion control module having a plurality of modes configured to drive the at least one wheel at a plurality of speeds and an RF phasing module configured to detect a phase difference between the RF signal and the reflected signal to estimate the moisture condition; and
- the RF transceiver includes an RF transmitter that transmits the RF signal toward the support and an RF receiver that measures the reflected signal reflected by the support.

According to a second aspect of the present disclosure, a vehicle includes at least one wheel that drives a tire to move the vehicle along a support. The vehicle includes a radio-frequency (RF) transceiver that transmits an RF signal toward the support and measures a reflected signal. The vehicle includes a drive unit that drives rotation of the at least one wheel. The vehicle includes control circuitry in communication with the RF transceiver and the drive unit. The control circuitry is configured to control the RF transceiver to output the RF signal at a first phase. The control circuitry is configured to compare a second phase of the reflected signal to the first phase to detect a phase difference. The control circuitry is configured to estimate a moisture condition of the support based on the phase difference, determine a level of friction between the tire and the support based on the moisture condition, and communicate an output to adjust a force between the tire and the support in response to the level of friction.

Embodiments of the second aspect of the present disclosure can include any one or a combination of the following features:

- the control circuitry is configured to detect an amplitude difference between the RF signal and the reflected signal and determine a reflection coefficient of the support based on the amplitude difference;
- the control circuitry is configured to determine a propagation delay based on the phase difference;
- the control circuitry is further configured to determine a target delay for the RF signal based on the distance and compare the target delay to the propagation delay to estimate the moisture condition;
- a brake system configured to selectively limit rotation of the tire in response to the level of friction; and
- the control circuitry includes a motion control module having a plurality of modes configured to drive the at least one wheel at a plurality of speeds and an RF phasing module configured to detect a phase difference between the RF signal and the reflected signal to estimate the moisture condition.

According to a third aspect of the present disclosure, a vehicle includes at least one wheel that drives a tire to move the vehicle along soil. The vehicle includes a radio-frequency (RF) transmitter that transmits an RF signal toward the soil. The vehicle includes an RF receiver that receives a reflected signal reflected off of the soil and a drive unit that drives rotation of the at least one wheel. The vehicle includes control circuitry in communication with the RF transmitter, the RF receiver, and the drive unit. The control circuitry is configured to control the RF transmitter to output the RF signal at a first phase. The control circuitry is configured to compare a second phase of the reflected signal to the first phase to detect a phase difference and estimate a moisture condition of the soil based on the phase difference. The control circuitry is configured to determine a level of friction between the tire and the soil based on the moisture condition, and communicate an output to adjust a force between the tire and the support in response to the level of friction.

Embodiments of the third aspect of the present disclosure can include any one or a combination of the following features:

a brake system configured to selectively limit rotation of the tire in response to the level of friction.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
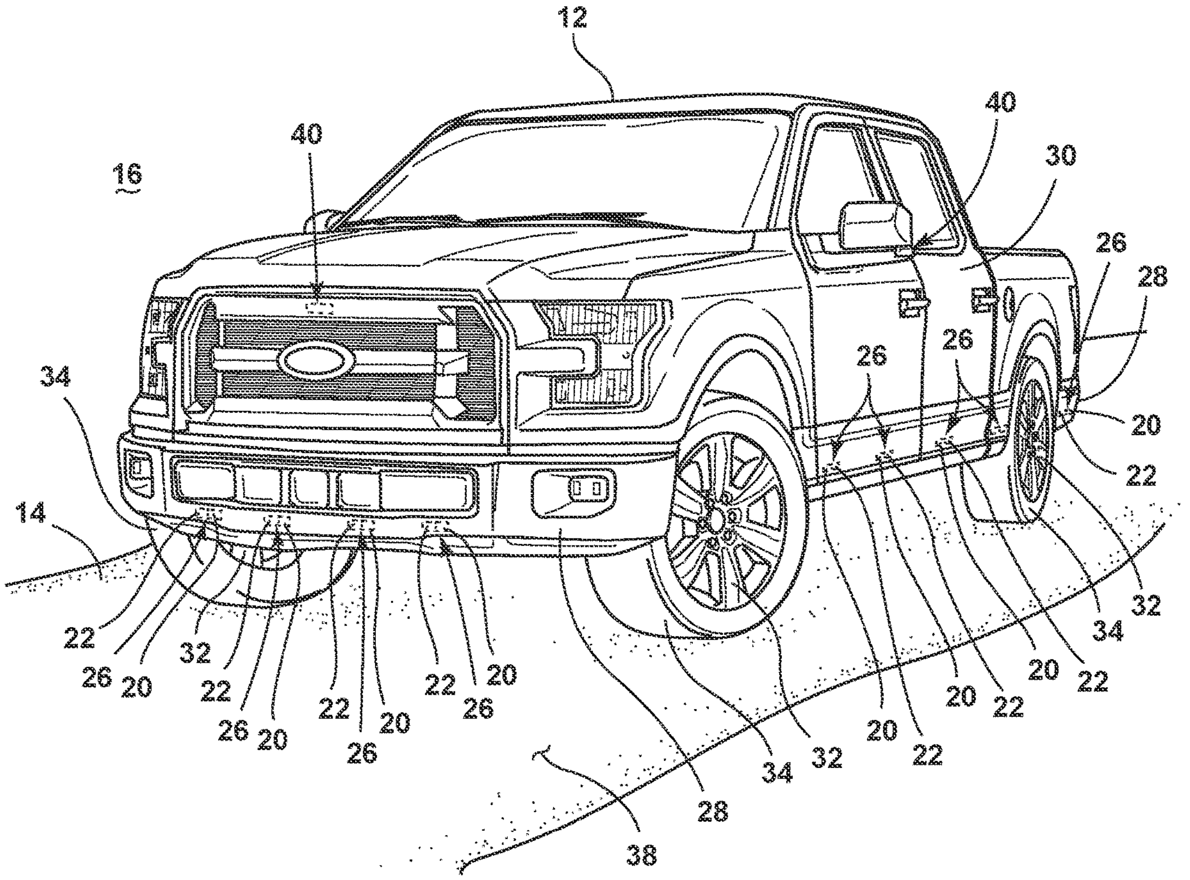
FIG. 1 is a perspective view of a vehicle incorporating a radio-frequency detection system for optimizing traction control for the vehicle.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements may or may not be to scale and certain components may or may not be enlarged relative to the other components for purposes of emphasis and understanding.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a friction estimation for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring generally to FIGS. 1-5, a traction control system 10 using RF processing provides for enhanced motion of a vehicle 12 along a support 14. The support 14 may include any suitable contact surface, such as a road surface or an off-road surface. In general, a proactive method of controlling vehicle motion is provided by actively scanning, via RF, a region external 16 to the vehicle 12 and measuring return RF from the region external 16. For example, an RF transmission signal 18 may be emitted from an RF transmitter 20, and an RF receiver 22 may measure a reflected RF signal 24 in response to the RF transmission signal 18 reflecting off of the support 14. The measurements taken may be applied to various qualities of the reflected RF signal 24. Based on differences between the RF transmission signal 18 and the reflected RF signal 24, the traction control system 10 can classify the surroundings of the vehicle 12, and, more particularly, the surface conditions of the support 14. Thus, by using RF control, the traction control system 10 can proactively adjust various aspects for maintaining traction between the vehicle 12 and the support 14, thereby limiting uncomfortable reactions to shifts in surface friction conditions.

Referring now more particularly to FIG. 1, the vehicle 12 incorporates a plurality of RF devices 26 that are configured to emit and/or receive RF signals. The RF devices 26 may be pre-installed RF devices 26, such as ultra-wideband (UWB) transceivers disposed on a front or a rear facia 28 of the vehicle 12 for detecting blind spots and/or cross-traffic conditions. The RF devices 26 may be positioned to capture friction information about the support 14 ahead, or in front of, the vehicle 12. As illustrated, the RF devices 26 may also or alternatively be disposed along sides 30 of the vehicle 12 for capturing friction conditions of areas of the region external 16 on sides 30 of the vehicle 12. In general, the RF devices 26 are employed for gathering friction information about the support 14 on which the vehicle 12 is disposed and/or is moving toward.

The vehicle 12 includes a plurality of wheels 32 each configured to drive a tire 34 to move along the vehicle 12 along the support 14. As will be described further in reference to the proceeding figures, each wheel 32 may be driven by a drive unit 96 (FIG. 4) that includes a motor or other driving mechanism. In general, the traction control system 10 is configured to estimate the friction conditions between the tire 34 and a support surface 38 of the support 14 and control the drive unit 96, or another vehicle system, in response to the friction of friction conditions. For example, when moving through a muddy terrain, the RF devices 26 may detect a moisture level and/or a compactness level of the support 14 (e.g., soil, gravel) and reduce or increase a rotation per minute (RPM) of one or more of the plurality of wheels 32 to move the vehicle 12 in a motion direction 50.

Figure 2:
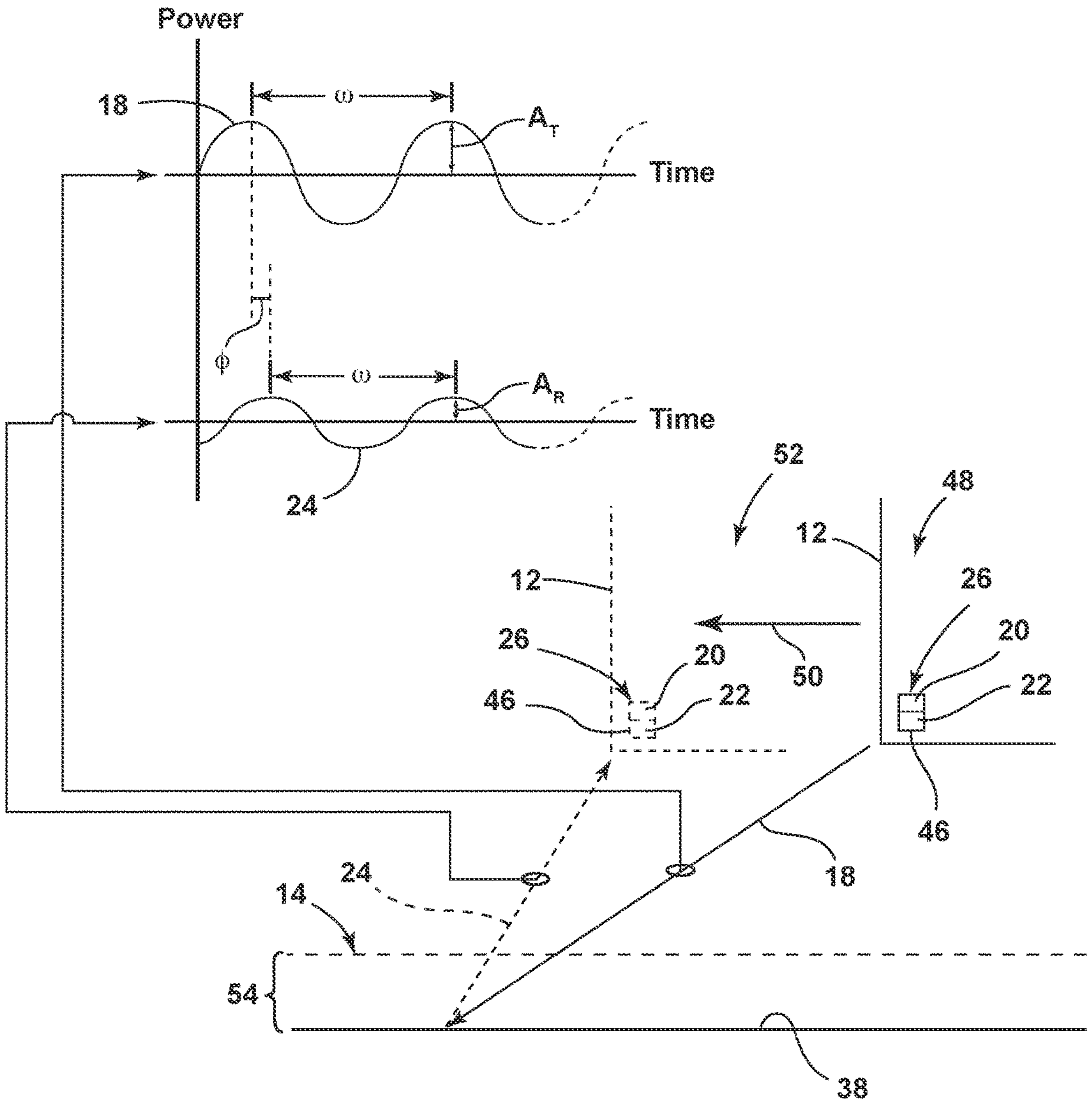
FIG. 2 is a functional block diagram of a friction estimation system for a vehicle demonstrating transmitted and reflective reflected RF signals to/from a support for a vehicle.

With continued reference to FIGS. 1 and 2, auxiliary detection sources 40, 42, 44, such as cameras 40, radio detection and ranging sensors (RADARs 42), light detection and ranging sensors (LiDARs 44), and/or any other detection sources may be coupled with the vehicle 12 for monitoring the region external to the vehicle 12. In a non-limiting example, the auxiliary detection sources 40, 42, 44 are configured to detect a distance between the RF device 26 and the support 14 to provide for calibration of the RF devices 26. For example, differences in the reflected RF signal 24 and the RF transmission signal 18 may be at least partially based on the distance from the RF device 26 and the support surface 38. The auxiliary detection sources 40, 42, 44 may be referred to as time-of-flight devices configured to detect a distance from the vehicle 12 to the support 14 along a path of the RF communication. In some examples, the RF devices 26 are configured to operate in a first mode for friction estimation and a second mode for distance detection. In this example, the auxiliary detection sources 40, 42, 44 may be omitted and software of the traction control system 10 may control the RF devices 26 to toggle between the first mode and the second mode. In this way, time-of-flight for distance detection can be employed simultaneously with friction estimation using a common RF device 26.

Referring now to FIG. 2, an example of the RF transmission signal 18 and the reflected RF signal 24 are demonstrated during a movement of the vehicle 12. In this example, the RF device 26 is an RF transceiver 46 incorporating both transmission (via the RF transmitter 20) and receiving (via an RF receiver 22) properties for RF signals. It is contemplated that, in other examples, the RF device 26 includes the RF receiver 22 separate from the transmitting device (e.g., in another housing or package). In the example illustrated, the vehicle 12 is moving from a first position 48 in the movement direction 50 toward a second position 52 and the RF transmission signal 18 is reflected off of the support surface 38 (as the reflected RF signal 24). The reflected RF signal 24 is received at the RF device 26 when the vehicle 12 is at the second position 52. It is contemplated that the present RF transmission/reception arrangement may be applied in conditions in which the vehicle 12 is not moving relative to the support surface 38 (e.g., parked). In either case, differences between the RF transmission signal 18 and the reflected RF signal 24 may be detected by the traction control system 10, and such differences may be correlated to friction conditions of the support 14.

With continued reference to FIG. 2, the RF transmission signal 18 may pass through a medium 54, which may include air and layers of the support 14. Based on the density, moisture content, or other features of the support 14, the reflected RF signal 24 may include differences in phase, power, or any other property of the RF transmission signal 18. For example, the support 14 may include grass, topsoil, gravel, mud, or any other elements of a support 14 over which the vehicle 12 may be moved or be parked. Such layers of the support 14 may interfere with the RF transmission signal 18 to cause the reflected RF signal 24 to have different amplitude or phase properties.

Referring more particularly to the plotted components in FIG. 2, the RF transmission signal 18 may have a wavelength $\omega$ that is consistent between RF transmission signal 18 and the reflected RF signal 24. Accordingly, signals transmitted at a given frequency may be returned at a given frequency. Variations in the reflected RF signal 24 may therefore be in the form of changes to amplitude and changes to phase of the RF transmission signal 18. For example, power of the transmitted signal may be greater than the power of the reflected RF signal 24. Examples of power may refer to any electromagnetic property of the RF waves, such as voltage, current, magnetic power, etc. In this example, a first amplitude $A_T$ of the RF transmission signal 18 (e.g., the transmission amplitude $A_T$) may be greater than a second amplitude $A_R$ of the reflected RF signal 24 (e.g., the return amplitude $A_R$).

In addition, or alternatively, the reflected RF signal 24 may have a phase difference $\Phi$ compared to the RF transmission signal 18, such that the reflected RF signal 24 is out of phase with the phase of the RF transmission signal 18. The phase difference $\Phi$ may refer to distance, time, degrees, radians, or another quality of the phase. For example, the RF transmission signal 18 of FIG. 2, expressed in a waveform, has the curvature of sin (t), where t is time. The reflected RF signal 24 may have a waveform of $K \cdot \sin(t+\Phi)$, where K is a constant proportional to the amplitude (e.g., a reflection coefficient K). In this example, K is a fraction less than one due to the smaller amplitude $A_R$ of the reflected RF signal 24 relative to the amplitude $A_T$ of the RF transmission signal 18.

Still referring to FIG. 2, the traction control system 10 may detect the differences between the RF transmission signal 18 and the reflected RF signal 24 and correlate the differences to friction conditions of the support 14. For example, the method executed by the traction control system 10 (FIG. 4) may extract, or determine, propagation delay and/or the reflection coefficient K by detecting differences in the amplitude and the phase difference $\Phi$. Principles of soil mechanics may then be used to determine soil compactness and/or surface friction. Thus, the traction control system 10 may optimize or enhance on-road and off-road motion control for the vehicle 12.

It is contemplated that, although illustrated as separate signals (e.g., the RF transmission signal 18 and the reflected RF signal 24), a combination signal summing the RF transmission signal 18 and the reflected RF signal 24 may be processed by the traction control system 10 in an alternative. For example, by operating as an antenna, the RF devices 26 may communicate the summation signal to an RF processing controller 56 (FIG. 4) that decompresses or extracts the reflected RF signal 24 into isolated portions and compares the extracted signal to the RF transmission signal 18. For example, the RF device 26 may be controlled to emit the RF transmission signal 18 having a specific amplitude, frequency, and phase, and the detected signal may be the combined signal of both the transmitted components and the reflected components. Because of the cumulative effect of both signals, the received signal strength may be increased or lessened.

Referring now to FIGS. 3A-3D, various examples of the support 14 over which the vehicle 12 may rest or may move demonstrate variations in the reflected RF signals 24 based on moisture conditions and compactness of the support 14. In general, the return amplitude and phase difference Φ of the reflected RF signal 24 may be detected by the traction control system 10 and correlated with friction conditions. For example, the traction control system 10 may correlate a greater phase difference Φ with high moisture content of the support 14 and correlate a reduced power level (e.g., return amplitude $A_R$) of the reflected RF signal 24 with high compactness. Such correlation may be performed by the RF processing controller 56 (FIG. 4) that compares the reflected RF signal 24 properties to predefined values and threshold data (e.g., a threshold phase shift value, a threshold amplitude shift value) to determine characteristics of the support 14 and/or the signal. The characteristics include the reflection coefficient K of the support 14, the propagation delay of the RF communication, density of the support 14 (e.g., compactness of soil), moisture content of the support 14 (e.g., moisture content of soil), a shear modulus of the support 14 (e.g., a shear modulus of soil), or any other characteristic that may influence the output generated by the traction control system 10.

Figure 3A:
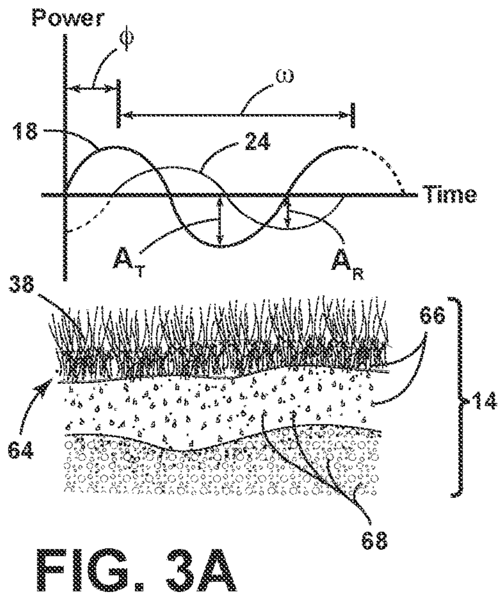
FIG. 3A-3D are for exemplary cross-sections of supports for a vehicle demonstrating differences in reflected RF signals based on the properties of the support.
Figure 3B:
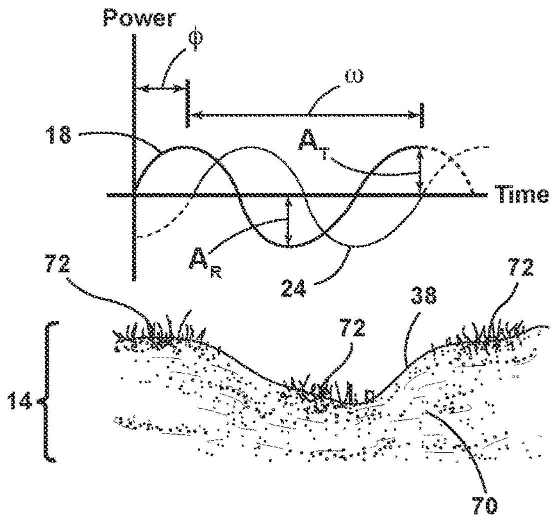

For example, FIGS. 3A and 3B each depict examples in which the support 14 includes relatively high moisture content (e.g., wet soil and mud). A reduced amplitude of the reflected RF signal 24 may be correlated to the support 14 having a high reflection coefficient K (e.g., asphalt with puddles (FIG. 3C) and dry, dense ground (FIG. 3D)). Other conditions of the support 14 may cause similar phase and/or amplitude differences in the reflected RF signal 24 to the examples shown. For example, icy conditions, slippery conditions, sandy conditions, or any other conditions of the support 14 may be correlated to the phase and amplitude differences of the reflected RF signal 24.

In general, given soil moisture and compactness estimations, the terrain properties (e.g., shear strength, internal friction angle) may further be estimated based on the propagation delay and/or the phase difference Φ. For example, the volumetric soil moisture content may be between 15% and 25% for sandy soils, 35% to 45% for loam soils, and 45% to 55% for clay soils. Based on predefined shear strength and internal friction force angles associated with the types of soil, the motion profile and/or forces applied to the support 14 by the wheels 32 may be adjusted. The load on the support 14 (e.g., the weight of the vehicle 12 and any objects in the vehicle 12) may be used to further characterize the response of the traction control system 10. For example, weight information from one or more weight sensors 62 (FIG. 4) may be used by the traction control system 10 to further refine the adjustment determined by the traction control system 10 to limit "spinning wheels" or other events with limited traction between the tires 34 and the support 14. In this way, calculated soil mechanics and/or predefined or estimated vehicle parameters allow the traction control system 10 to model sinkage on soil, thrust, motion resistance, slip, etc., and estimate the torque required to push through the soil, steering angle for the wheels 32, and/or any other parameter that may control friction between the tires 34 and the support 14.

With particular reference to FIG. 3A, the support 14 includes a grassy terrain 64 having several soil layers 66. The soil layers 66 have a relatively high level of moisture, as indicated by water droplets 68 within the soil layers 66. As a result, the grassy terrain 64 has a wet, compressible driving surface that has a low compactness. The RF transmission signal 18, therefore, reflects with less power due to the soil having high conductivity and low permittivity, and a relatively large phase difference Φ also occurs between the RF transmission signal 18 and the reflected RF signal 24. The traction control system 10 may correlate the reduced amplitude and significant phase shift with a longer propagation delay (e.g., a period of time for the signal to return to the RF device 26). Based on the propagation delay, the soil compactness and/or the moisture contact content may be estimated by the traction control system 10, and the support surface 38 may be classified (e.g., in this case, as a wet, compressible surface). Using this classification, the traction control system 10 may control the wheels 32 with greater or less torque or may provide any other output to adjust traction between the tires 34 and the support 14 (e.g., steering angle, brakes, etc.).

In another example, and as illustrated in FIG. 3B, the support 14 is a muddy composite 70 having patches of grass 72 and having a relatively high compactness. In such an example, the amplitude $A_R$ of the reflected RF signal 24 may have a similar amplitude $A_T$ as the RF transmission signal 18, while also having a significant phase difference Φ between the RF transmission signal 18 and the reflected RF signal 24. Accordingly, a greater propagation delay may be determined by the traction control system 10, and the reflection coefficient K of the support 14 may be estimated by the traction control system 10 based on the limited change in amplitude of the reflected RF signal 24.

Figure 3C:
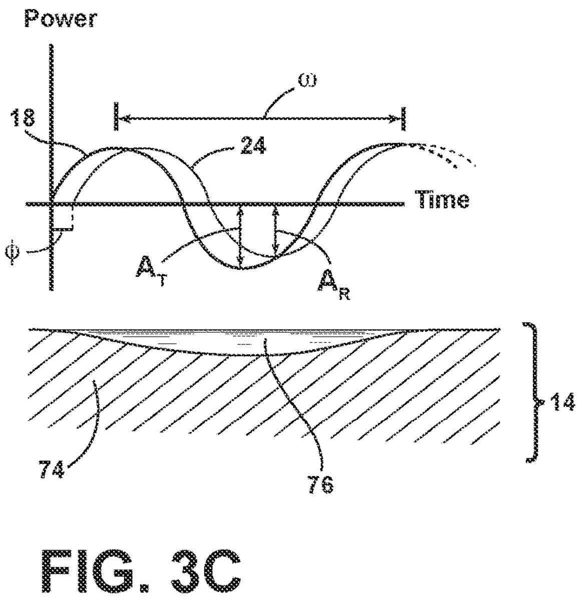

With particular reference to FIG. 3C, a hardened roadway 74 is scanned by the traction control system 10. For example, concrete, asphalt, dense gravel, or the like may be the support 14. In this example, the traction control system 10 detects a relatively high reflection coefficient K due to a puddle of water 76. Conversely, the area around the puddle (dry, hardened roadway 74) may result in a low reflection coefficient K due to the conductivity and/or density of the hardened roadway 74. Accordingly, the traction control system 10 may detect the differences in the signals 18, 24 as the vehicle 12 moves along the support surface 38 to detect puddles or other water or ice condition on the roadway and control the torque on the wheels 32 in response to such detection.

Figure 3D:
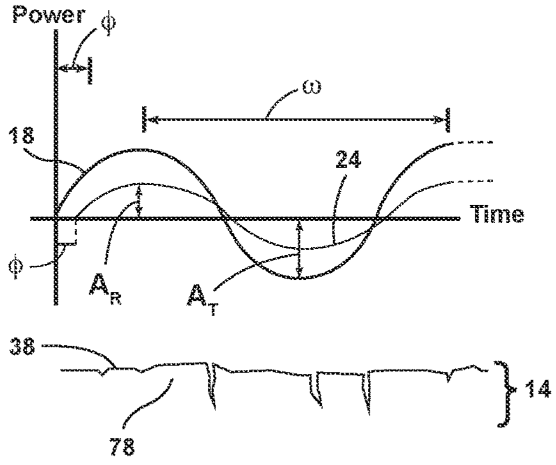

With particular reference to FIG. 3D, dry, cracked dirt 78 serves as the support 14 monitored by the RF device 26. In this example, due to the conductivity of the dirt 78 (e.g., low moisture content), the amplitude $A_R$ of the reflected RF signal 24 is similar to the amplitude $A_T$ of the RF transmission signal 18. Accordingly, the traction control system 10 may determine the reflection coefficient K to be relatively high. Due to the compactness of the dry dirt 78 in this example, the reflected RF signal 24 may take longer to pass through the dirt 78, thereby resulting in the phase difference Φ. The traction control system 10 may therefore classify the surface as dry ground and determine any adjustment for the force applied by the wheels 32 to limit skidding and keep traction between the tires 34 and the support 14.

Figure 4:
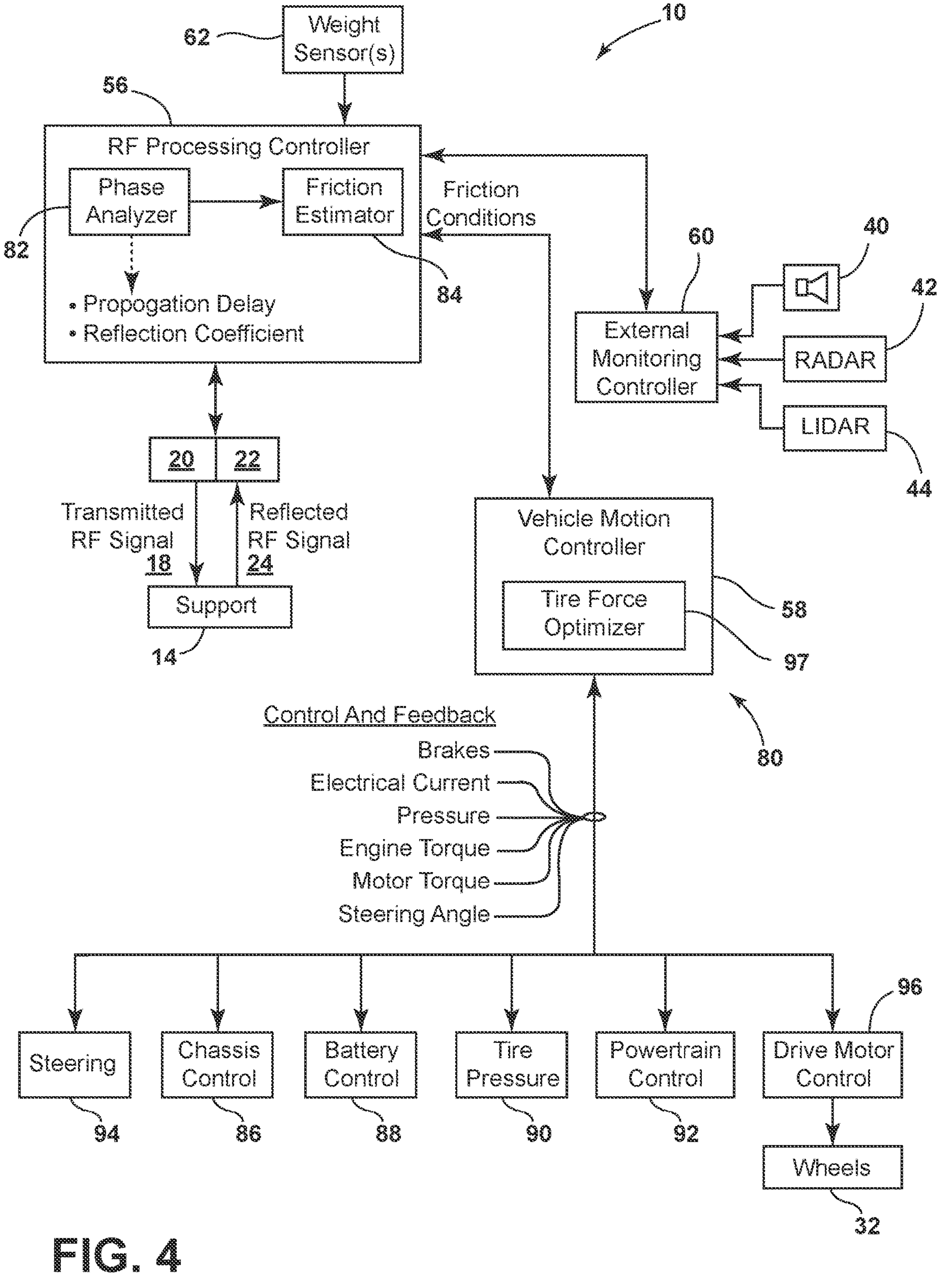
FIG. 4 is a block diagram of a traction control system for a vehicle according to one aspect of the present disclosure.

Referring now to FIG. 4, the traction control system 10 includes control circuitry 80 that is configured to estimate moisture conditions of the support 14 based on the reflected RF signal 24, determine the level of friction between the tire 34 and the support 14 based on a moisture condition, and communicate an output to adjust rotation of at least one of the wheels 32 in response to the level of friction. The control circuitry 80 may include one or more controllers 56, 58, 60 and exemplarily includes an RF processing controller 56 and a vehicle motion controller 58. Each of the controllers 56, 58, 60 may include one or more processors configured to execute instructions stored in a memory of the controllers 56, 58, 60. When the instructions are executed by the given processor, each of the controllers 56, 58, 60 is configured to communicate data, including writing to or reading from memory, related to traction control for the vehicle 12. For example, the RF processing controller 56 may include a phase analyzer module 82, or RF phasing module, that is configured to process the reflected RF signal 24 from the support 14 detected by the RF device 26. The phase analyzer module 82 may determine a propagation delay and/or the reflection coefficient K based on the phase analysis. It is contemplated that the phase analyzer module 82 may further detect a power level of the signal (e.g., the amplitude $A_R$ of the reflected RF signal 24) and compare one or both of the amplitude $A_R$ of the reflected RF signal 24 and the phase difference Φ to the RF transmission signal 18 to determine the propagation delay and/or the reflection coefficient K.

The RF processing controller 56 includes a friction estimator unit 84 that is configured to correlate the propagation delay and/or the reflection coefficient K to the surface friction of the support 14. For example, the friction estimator unit 84 may estimate a low level or high level of friction between the tires 34 and the support 14 based on predefined properties of the tire 34 and the detected properties of the support 14. The friction conditions may then be communicated to the vehicle motion controller 58 to allow the vehicle motion controller 58 to adjust at least one parameter of one or more vehicle systems. For example, the vehicle motion controller 58 may control a force exerted by the wheels 32 that may be controlled using any one of a chassis control unit 86, a battery control unit 88, a tire pressure control unit 90, a powertrain control unit 92, a steering system 94 for the vehicle 12, and/or a drive motor control unit 96. By controlling the one or more vehicle systems, the vehicle motion controller 58 may optimize a force applied to the support 14 by the tire 34 to drive the vehicle 12 in the motion direction 50. Such processing may further include feedback having the status of brakes, an electrical current or another electrical property, a steering angle of the at least one wheel 32, a pressure of the tires 34, engine torque, and/or motor torque applied to the wheels 32. Thus, in addition to having a proactive element to the traction control system 10, feedback from the vehicle systems may further refine the action taken by the vehicle motion controller 58 such that the feedback and the communicated signals to the vehicle systems may be provided by a tire force optimizing unit 97 of the vehicle motion controller 58. In this way, the tire 34 force optimizing unit can enhance motion of the vehicle 12 at a desired speed or and/or desired direction, as previously described.

Still referring to FIG. 4, the traction control system 10 may also include an external monitoring controller 60 in communication with the RF processing controller 56. The external monitoring controller 60 may operate with any combination of the auxiliary detection sources 40, 42, 44, such as the cameras 40, the RADARs 42, and/or the LiDARs 44 that may be operable to detect a distance between the RF device 26 of the vehicle 12 and the support 14. For example, if the RF devices 26 have a field of view covering the support 145 meters (16.4 feet) in front of the vehicle 12 as the vehicle 12 moves forward, the distance to the support 14 may vary based on a terrain over which the vehicle 12 is moving toward. For example, if the vehicle 12 is moving up a hill, the RF devices 26 may scan the support 14 at a distance of less than 5 meters due to the RF transmission signal 18 reflecting off the hill. In such examples, the external monitoring controller 60 may more accurately estimate the distance between the RF device 26 and the support 14, and, more particularly, the area of the support 14 being scanned by the RF device 26. Thus, the auxiliary detection sources 40, 42, 44 connected to the external monitoring controller 60 may capture image data (from the cameras 40), distance data (from the RADARs 42), and/or depth information parentheses (from the LiDARs 44). The distance information may be communicated to the RF processing controller 56 to allow the RF processing controller 56 to check the propagation delay and the reflection coefficient K. For example, the phase analyzer module 82 may operate based on a predefined distance being measured and, when such predefined distance is inaccurate, the predefined distance may be assigned to the distance estimated by the external monitoring controller 60. In this way, the propagation delay and reflection coefficient K detected by the phase analyzer unit 82 may be more accurately estimated.

The time of flight of the RF communication may be used by the control circuitry 80 to determine the distance from the vehicle 12 to the support 14. The control circuitry 80 may be configured to determine a target delay for the RF communication based on the distance and compare the target delay to the propagation delay to estimate the moisture condition. For example, there may be an expected delay of the RF communication based on an average distance from the vehicle 12 to the support 14.

Still referring to FIG. 4, the one or more weight sensors 62 may detect the load on the support 14 and communicate the load information to the vehicle motion controller 58. Based on the load information, the vehicle motion controller 58 may be configured to drive the wheels 32 with higher or lower torque, jerk, speed, acceleration, or any other motion profile attribute. Thus, the traction control system 10 may provide a response that uses the friction condition predictions in tandem with other feedback, including the weight of the vehicle 12.

By way of example, the control circuitry 80 of the traction control system 10 can use the friction conditions estimated by the RF processing controller 56 to control force, such as torque, applied to the tires 34. Thus, an acceleration, a velocity, a jerk, or any other motion control property for driving the tires 34 may be adjusted by the vehicle motion controller 58 to enhance movement of the vehicle 12. In one example, the vehicle 12 rests on wet ground that has a high moisture content. Based on the classification of the ground by the RF processing controller 56 as being wet, the vehicle motion controller 58 may drive one or more of the tires 34 at an RPM slower than requested or instructed actively by a user of the vehicle 12. For example, if the user depresses a gas pedal to drive the wheels 32 at a high RPM, the traction control system 10 may adjust the desired RPM to a target RPM lower than the desired RPM to cause the vehicle 12 to move forward. The adjustment communicated by the control circuitry 80 may therefore be determined based on the classification of the friction conditions of the support 14.

In another example, the vehicle 12 is moving in the motion direction 50 and the RF device 26 detects slippery conditions (e.g., standing water, rainwater accumulation, icy conditions, etc.) along a projected route (e.g., on a roadway) of the vehicle 12 based on the qualities of the reflected RF signal 24. In response to detection of the slippery conditions, the traction control system 10 may communicate an instruction to adjust an operation of the vehicle motion controller 58. The response of the vehicle motion controller 58 may be to adjust driving of the wheels 32, braking of the brake system, power distribution of the battery control unit 88, or any other parameter that may adjust friction or force between one or more of the tires 34 relative to the support 14. In this way, the traction control system 10 may be pro-active to limit sudden shifts in traction.

Figure 5:
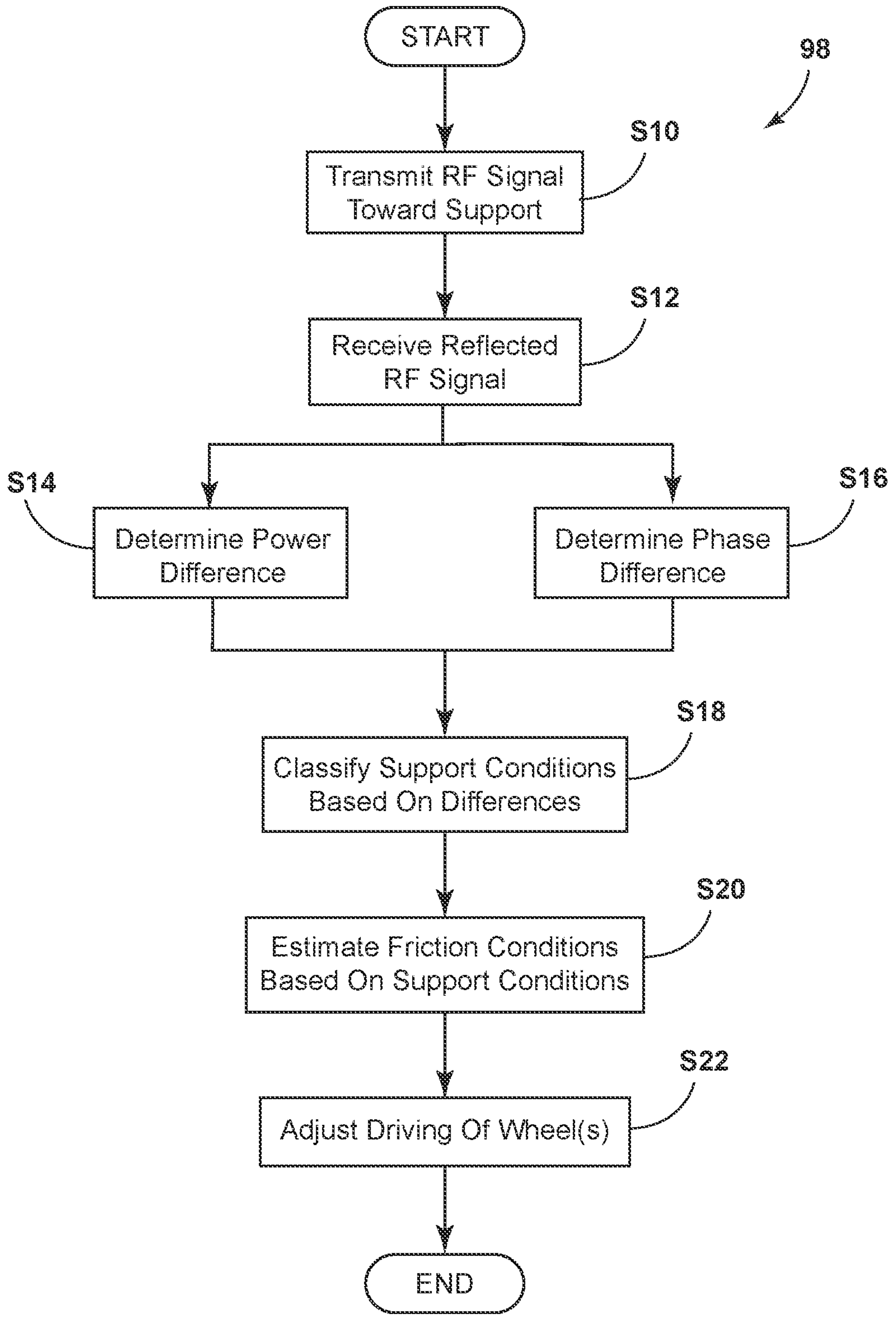
FIG. 5 is a process flow diagram for a traction control system of a vehicle according to one aspect of the present disclosure.

Referring now to FIG. 5, an exemplary process 98 carried out by the traction control system 10 includes transmitting the RF transmission signal 18 toward the support 14 at step S10. For example, the RF processing controller 56 may communicate with the RF transmitter 20 to transmit the RF transmission signal 18 at a frequency and an amplitude at an initial phase. At step S12, the RF processor receives the reflected RF signal 24 which includes at least one of a phase to the phase difference Φ (e.g., a phase delay) and an adjusted amplitude (e.g., an increased amplitude or a decreased amplitude). For example, at step S14, the traction control system 10 may determine the power difference, and at step S16, the traction control system 10 may determine the phase difference Φ. Applying the process 98 to the example illustrated in FIG. 4, the RF processing controller 56 may perform steps S10 through S16.

The RF processing controller 56 may classify support conditions based on differences in the transmitted signal and the reflected RF signal 24 at step S18. At step S20, the traction control system 10 estimates friction conditions based on the classification of the support 14 (e.g., conditions of the support 14). For example, if the support conditions are classified as icy, muddy, wet, sandy, or any other support condition, the RF processing controller 56 may associate such classifications with a surface friction estimation.

As previously described, the friction conditions can include surface texture, such as soil texture, shear strength, shear modulus, and the like. The traction control system 10 may determine the friction conditions by measuring the differences between the RF transmission signal 18 and the reflected RF signal 24, classifying the differences into types of terrain conditions (e.g., soil, soil moisture, soil compactness, hard roadway, gravel, ice, water, etc.), and determining the friction qualities of the given terrain in the region external. For example, wet dirt 78 may be more likely to result in the vehicle 12 getting stuck than dry dirt 78.

Still referring to FIG. 5, at step S22, the motion of the wheels 32 may be adjusted to move the vehicle 12 and the desired motion direction 50. For example, the RF processing controller 56 may communicate the friction conditions to the vehicle motion controller 58. In response, the vehicle motion controller 58 may communicate instructions to one or more of the vehicle systems previously described. For example, the vehicle motion controller 58 may adjust driving of a motor controller for one or more of the wheels 32 of the vehicle 12 to adjust a torque or a force applied to the support 14. In some examples, step 22 includes adjusting force between the tire 34 and the support 14 using any feature of the traction control system 10.

In general, the traction control system 10 may provide enhancements for off-road vehicle applications, such as when the vehicle 12 is presented with unknown terrain or modified surface conditions relative to stored data of the terrain. Further, the present traction control system 10 may enhance operation of multi-mode traction control for adjusting operation over a plurality of terrains.

It is to be understood that variations and modifications can be made on the aforementioned structure without departing from the concepts of the present disclosure, and further, it is to be understood that such concepts are intended to be covered by the following claims unless these claims by their language expressly state otherwise.

What is claimed is:

1. A vehicle, comprising:

at least one wheel that drives a tire to move the vehicle along a support;

a radio-frequency (RF) transceiver that transmits an RF signal toward the support and measures a reflected signal;

a drive unit that drives rotation of the at least one wheel; and control circuitry in communication with the RF transceiver and the drive unit, the control circuitry configured to:

estimate a moisture content of the support based on the reflected signal;

determine a type of soil based on the estimated moisture content;

determine a level of friction between the tire and the support based on the moisture content; and communicate an output to adjust a force between the tire and the support in response to the level of friction, wherein the force adjustment is at least in part based on internal friction force angles associated with the type of soil.

2. The vehicle of claim 1, wherein the control circuitry is configured to:

control the RF transceiver to output the RF signal at a first phase;

compare a second phase of the reflected signal to the first phase to detect a phase difference; and estimate the moisture content of the support based on the phase difference.

3. The vehicle of claim 2, wherein the control circuitry is configured to:

determine a propagation delay based on the phase difference.

4. The vehicle of claim 3, wherein the support is soil and the control circuitry is configured to estimate a soil compactness level based on the propagation delay.

5. The vehicle of claim 3, further comprising:

a time-of-flight device configured to detect a distance from the vehicle to the support along a path of the RF signal, wherein the control circuitry is further configured to:

determine a target delay for the RF signal based on the distance; and compare the target delay to the propagation delay to estimate the moisture content.

6. The vehicle of claim 2, wherein the control circuitry is configured to:

detect an amplitude difference between the RF signal and the reflected signal; and determine a reflection coefficient of the support based on the amplitude difference.

7. The vehicle of claim 6, wherein the support is soil and the control circuitry is configured to estimate a soil compactness level based on the reflection coefficient.

8. The vehicle of claim 2, wherein the control circuitry is configured to:

determine a shear modulus of the support based on the phase difference.

9. The vehicle of claim 2, wherein the control circuitry is configured to:

determine a friction angle of the support based on the phase difference.

10. The vehicle of claim 1, further comprising:

a brake system configured to selectively limit a rotation of the tire in response to the moisture content.

11. The vehicle of claim 1, wherein the control circuitry includes:

a motion control module having a plurality of modes configured to drive the at least one wheel at a plurality of speeds; and an RF phasing module configured to detect a phase difference between the RF signal and the reflected signal to estimate the moisture content.

12. The vehicle of claim 1, wherein the RF transceiver includes an RF transmitter that transmits the RF signal toward the support and an RF receiver that measures the reflected signal reflected by the support.

13. A vehicle, comprising:

at least one wheel that drives a tire to move the vehicle along a support;

a radio-frequency (RF) transceiver that transmits an RF signal toward the support and measures a reflected signal;

a drive unit that drives rotation of the at least one wheel; and control circuitry in communication with the RF transceiver and the drive unit, the control circuitry configured to:

control the RF transceiver to output the RF signal at a first phase;

compare a second phase of the reflected signal to the first phase to detect a phase difference;

estimate a moisture content of the support based on the phase difference;

determine a type of soil comprising the support based on the estimated moisture content;

determine a level of friction between the tire and the support based on the moisture content; and communicate an output to adjust a force between the tire and the support in response to the level of friction, wherein the force adjustment is at least in part based on predefined shear strength values associated with the type of soil.

14. The vehicle of claim 13, wherein the control circuitry is configured to:

detect an amplitude difference between the RF signal and the reflected signal; and determine a reflection coefficient of the support based on the amplitude difference.

15. The vehicle of claim 13, wherein the control circuitry is configured to:

determine a propagation delay based on the phase difference.

16. The vehicle of 15, further comprising:

a time-of-flight device configured to detect a distance from the vehicle to the support along a path of the RF signal, wherein the control circuitry is further configured to:

determine a target delay for the RF signal based on the distance; and compare the target delay to the propagation delay to estimate the moisture content.

17. The vehicle of claim 13, wherein the control circuitry includes:

a motion control module having a plurality of modes configured to drive the at least one wheel at a plurality of speeds; and an RF phasing module configured to detect a phase difference between the RF signal and the reflected signal to estimate the moisture content.

18. A vehicle, comprising:

at least one wheel that drives a tire to move the vehicle along soil;

a radio-frequency (RF) transmitter that transmits an RF signal toward the soil;

an RF receiver that receives a reflected signal reflected by the soil;

a drive unit that drives rotation of the at least one wheel; and control circuitry in communication with the RF transmitter, the RF receiver, and the drive unit, the control circuitry configured to:

control the RF transmitter to output the RF signal at a first phase;

compare a second phase of the reflected signal to the first phase to detect a phase difference;

estimate a moisture content of the soil based on the phase difference and determine a type of soil based on the estimated moisture content;

determine a level of friction between the tire and the soil based on the moisture content; and communicate an output to adjust a force between the tire and the support in response to the level of friction, wherein the force adjustment is at least in part based on predefined shear strength values and internal friction force angles associated with the type of soil, and wherein the volumetric moisture content may be between approximately 15% and 25% for sandy soils, between approximately 35% and 45% for loam soils, and between approximately 45% and 55% for clay soils.

19. The vehicle of claim 13, wherein the force adjustment is at least in part based on predefined internal friction force angles associated with the type of soil comprising the support, and wherein the volumetric moisture content may be between approximately 15% and 25% for sandy soils, between approximately 35% and 45% for loam soils, and between approximately 45% and 55% for clay soils.

20. The vehicle of claim 1, wherein the force adjustment is at least in part based on predefined shear strength values associated with the type of soil, and wherein the volumetric moisture content may be between approximately 15% and 25% for sandy soils, between approximately 35% and 45% for loam soils, and between approximately 45% and 55% for clay soils.

* * * * *